United States Patent
Hagman

(10) Patent No.: US 6,643,154 B1
(45) Date of Patent: Nov. 4, 2003

(54) CONTROL OF EXTINCTION ANGLE FOR A LINE-COMMUTATED CONVERTER

(75) Inventor: Ingvar Hagman, Ludvika (SE)

(73) Assignee: ABB Group Services Center AB, Vasteras (SE)

( * ) Notice: Subject to any disclaimer, the term of this patent is extended or adjusted under 35 U.S.C. 154(b) by 0 days.

(21) Appl. No.: 10/070,438
(22) PCT Filed: Sep. 14, 2000
(86) PCT No.: PCT/SE00/01777
§ 371 (c)(1), (2), (4) Date: Jul. 24, 2002
(87) PCT Pub. No.: WO01/22552
PCT Pub. Date: Mar. 29, 2001

(30) Foreign Application Priority Data

Sep. 22, 1999 (SE) .............................. 9903402

(51) Int. Cl.$^7$ ............................. H02M 7/521
(52) U.S. Cl. ....................................... 363/96
(58) Field of Search ............... 363/95, 96, 98

(56) References Cited

U.S. PATENT DOCUMENTS

| | | | |
|---|---|---|---|
| 3,771,041 A | 11/1973 | Chadwick | 321/5 |
| 4,212,055 A * | 7/1980 | Podlewski | 363/96 |
| 4,494,179 A | 1/1985 | Inokuchi et al. | 363/35 |
| 4,554,623 A | 11/1985 | Ainsworth | 363/96 |
| 4,563,732 A * | 1/1986 | Ljungqvist et al. | 363/35 |
| 4,700,281 A * | 10/1987 | Thorn et al. | 363/96 |
| 4,884,181 A * | 11/1989 | Kaufhold | 363/96 |
| 5,220,493 A * | 6/1993 | Knittler | 363/96 |
| 5,701,239 A * | 12/1997 | Bjorklund et al. | 363/95 |
| 5,717,583 A * | 2/1998 | Nobayashi et al. | 363/95 |

* cited by examiner

Primary Examiner—Jeffrey Sterrett
(74) Attorney, Agent, or Firm—Oblon, Spivak, McClelland, Maier & Neustadt, P.C.

(57) ABSTRACT

A method for control of an extinction angle of a line-commutated converter in dependence on a minimum reference value for the extinction angle. The converter has a plurality of valves, each one of the plurality of valves having at least one semiconductor element capable of being fired, and the device has a unit for generating firing control pulses for a commutating valve in dependence on the minimum reference value of the extinction angle according to a given criterion for commutation of a direct current through the converter. The device has a unit for continuously forming an operating value of recovery time for the semiconductor element of a decommutating valve, and a unit for forming the minimum reference value of the extinction angle in dependence of the operating value.

10 Claims, 3 Drawing Sheets

CONTROL OF EXTINCTION ANGLE FOR A LINE-COMMUTATED CONVERTER

TECHNICAL FIELD

The present invention relates to a method for controlling the extinction angle for a line-commutated converter in dependence on a minimum reference value for the extinction angle, and to a device for carrying out the method.

BACKGROUND ART

An installation for transmission of high-voltage-direct current between two ac voltage networks comprises two converter stations, each one being connected on its ac voltage side to a respective one of the ac voltage net works, and a common dc connection.

Each one of the converter stations comprises a converter, usually at least one converter transformer for connection of the converter to the ac voltage network, and shunt filters for generating reactive power and for filtering harmonics. The converters are normally line-commutated, current-source converters, by which is to be understood that the current commutation between the valves of the converters, which usually are arranged in six-pulse bridges, takes place by means of voltages occurring in the ac voltage network, and that the dc connection, as viewed from the converters, occurs as a stiff current source. A converter valve usually comprises a plurality of mutually series-connected semiconductor elements, capable of being fired, in the form of thyristors.

During normal operation, one of the converters, hereinafter referred to as the rectifier, operates in rectifier operation, and the other, hereinafter referred to as the inverter, operates in inverter operation. Control equipment for the respective converter generates a control signal corresponding to a control angle $\alpha$, at which firing pulses are supplied to the valves of the converter. For the purpose of minimizing the consumption of reactive power by the converters and reducing the stresses on components included in the converter stations, it is advantageous to control the rectifier with the smallest possible control angle $\alpha$ and to control the inverter with the smallest possible extinction angle $\gamma$ (margin of commutation) without jeopardizing the controlled operation. The control system of the installation is therefore usually designed such that the inverter is controlled to a maximum dc voltage which is suitable for the operating conditions of the installation, taking into consideration safety margins with respect to commutating errors, voltage variations on the ac voltage network and other deviations from nominal operation which may occur. The rectifier is controlled in current control, the reference value of which is formed in dependence on a current order, which in its turn is formed in dependence on a power order and the actual dc voltage in such a way that the direct current and hence the transferred power remain at a desired value.

Usually, the control equipment for rectifiers and inverters are designed identical, whereby, in the rectifier, a current controller is activated and, in the inverter, control equipment for a control which aims at maintaining the extinction angle at, but not allowing it to fall below, a preselected minimum value is activated.

For a general description of the technique for transsot mission of high-voltage direct current, reference is made to Åke Ekström: High Power Electronics HVDC and SVC, The Royal Institute of Technology, Stockholm 1990, in particular chapter 4.

The current controller in the inverter is supplied, in addition to the reference value of the current in the dc connection and its actual value, also with a so-called current margin with such a sign that the control equipment of the inverter strives to reduce the direct current controlled by the rectifier. During stationary inverter operation, the output signal from the current controller of the inverter will thereby assume a maximum value limited by a limiting signal and the value of the control angle $\alpha$ ordered by the inverter is determined by the limiting signal.

Between the control angle $\alpha$, the extinction angle $\gamma$ and the overlap angle $\mu$, during which commutation between two valves takes place, the known relationship $\alpha+\mu+\gamma=180°$ prevails. It is thus desirable, for the inverter, to determine the control angle such that the extinction angle (the margin of commutation) remains at a predetermined minimum value.

U.S. Pat. No. 4,563,732 describes control equipment where the value of the control angle $\alpha$ ordered by the inverter is formed in dependence on the output signal from an OR circuit. The OR circuit is supplied with the output signal from the current controller of the inverter as well as with a control signal formed in dependence on a continuing predicted value of the extinction angle which would be the result if a commutation were to be started at the calculating instant. The valves of the inverter are thus fired in dependence on the signal which is supplied to the OR circuit earliest.

A control system for determining the above-mentioned predicted value of the extinction angle is further described in an article in a journal, Åke Ekström and Göte Liss; A refined HVDC Control System. IEEE Transactions on Power Apparatus and Systems, Vol. 59, No. 5/6, June 1970, pages 723–732. The system is based on the fact that a certain voltage-time area is required for carrying out the commutation. The criterion for the predicting control system is that, after completed commutation, the remaining voltage-time area is to exceed a certain prescribed minimum value. In the event that a voltage or current disturbance should occur during a commutation in progress, there is then a possibility of terminating this without any commutating error. A predicting member calculates continuously, by a triangular approximation of the curve shape of the voltage, the total voltage-time area which would remain if the semiconductor elements of the valve were to be fired at the running instant. The calculation is carried out by subtracting, from the continuously calculated triangular voltage-time area, a voltage-time area corresponding to the voltage-time area during the time the commutation process is taking place. This latter voltage-time area is directly proportional to the direct current in the dc transmission. The predicting control system gives a firing signal to the conmuutating valve, that is, the valve which is in turn to take over the current, when the remaining voltage-time area becomes equal to a given reference value, formed in dependence on a given minimum reference value $\gamma_{min}$ for the extinction angle.

In practice, the control equipment also comprises means for controlling that the ac voltage and the minimum control angle lie within the prescribed limits before a firing order is generated.

In Åke Ekström: High Power Electronics HVDC and SVC, The Royal Institute of Technology, Stockholm 1990, pages 7–14 to 7–16 and FIGS. 7–10, an embodiment of such control equipment is described, where the extinction angel $\gamma$ occurs explicitly. By means of a predicting member, containing information about the preceding zero crossing of the voltage, there is predicted continuously, in dependence on sensed values of commutating voltage and current, which commutating margin $\gamma_{pred}$ would be obtained if firing were to take place at the moment of prediction. The predicted commutating margin is compared with a reference value $\gamma_{order}$ for the minimum extinction angle and when the predicted value becomes equal to the reference value, a firing order is generated for the commutating valve.

In the same publication, on pages 7–13 and FIGS. 7–9, also an embodiment of such control equipment is shown, based on negative feedback of a sensed value of the extinction angle. A reference value $\gamma_{order}$ for the minimum extinction angle is compared with the sensed value and when this falls below the reference value, a firing order for the commutating valve is generated. To compensate for the delay caused by the feedback of the sensed value of the extinction angle, an addition to the reference value, formed in dependence on sensed commutating voltage and current, is given via a so-called disturbance detector.

A commutating process between two valves in a line-commutated converter is initiated when the thyristors in the commutating valve are fired. The thyristors in the decommutating valve are then supplied with a negative voltage, given by the ac voltage network, which strives to reduce the current by a rate of change which is determined by the impedance of the current circuit. The current passes through zero but continues for a certain period of time to flow through the thyristor in the inverse direction thereof, whereby both current and voltage across the thyristor have a negative polarity. The overlap angle is measured from the moment the commutation starts until the current through the decommutating thyristor becomes zero and the extinction angle from the moment when the current passes through zero until the voltage across the thyristor passes through zero to assume a positive polarity.

A thyristor is not able to take blocking voltage in the forward direction immediately after the current in the conducting direction of the thyristor has ceased, and the time required for it to recover this ability is referred to as the recovery time of the thyristor. In line-commutated converters, the control equipment must therefore be designed such that the minimum value of the extinction angle accommodates the recovery time of the thyristor. In addition to this, the minimum value must also comprise margins for voltage transients, to ensure a certain control margin for the transmission system in the event of an oscillation arising in the dc transmission, and, of course, also for the individual variations of the thyristors included in the valves of the converter. This generally leads to the above-mentioned minimum value of the extinction angle being set at 15–20°, normally in excess of 17°. Typically, about half of this extinction-angle value is due to the recovery time of the thyristor.

With increasing minimum value of the extinction angle follows an increasing consumption of reactive power while at the same time the available dc voltage becomes lower than the theoretically available dc voltage. Also the generation of harmonics increases with increasing extinction angle, both on the dc side of the inverter and on the ac voltage side thereof.

During implementation of the above-described pieces of control equipment with predicting control systems for extinction-angle control, the predicting member is supplied with a certain preselected reference value for the extinction angle, typically of the magnitude $\gamma_{min}$=16 °.

This leads to certain disadvantages. At low current a relatively, and probably unnecessarily, large margin towards commutating errors, caused, for example, by a voltage transient, is obtained, whereas inversely, at high current, the converter will operate with an extinction angle which approaches the recovery time of the thyristor, whereby the margin towards commutating errors drops.

SUMMARY OF THE INVENTION

The object of the invention is to provide an improved method of the kind described in the introductory part of the description, which permits a continuous adaptation of he extinction angle to operating parameters for the semiconductor elements in the valves of the converter, and a device for carrying out the method.

According to the invention, this is achieved by continuously forming an operating value of recovery time for the semiconductor elements of a decommutating valve, and by forming the minimum reference value of the extinction angle in dependence on this operating value.

According to an advantageous further development of the invention, the operating value of recovery time is formed in dependence on at least one of a continuously formed operating value of the junction temperature of the above-mentioned semiconductor elements, a continuously formed operating value of the rate of change of the blocking voltage of the operating value in the forward direction, and a continuously formed operating value of the rate of change of the commutated current.

With a method and a device according to the invention, a larger control range for the dc voltage of the inverter may be allowed while at the same time the current dependence of the margin with respect to commutating errors is reduced.

BRIEF DESCRIPTION OF THE DRAWINGS

The invention will be described in greater detail in the following by description of embodiments with reference to the accompanying drawings, which are all schematic and in the form of single-line diagrams and block diagrams, respectively, and wherein.

DESCRIPTION OF THE PREFERRED EMBODIMENTS

The following description relates to the method as well as to the device.

The device is shown in the figures by means of block diagrams, comprising, among other things, calculating members, and it is to be understood that the input and output signals to the respective blocks may consist of signals or of calculated values. Therefore, signal and calculated value are used synonymously in the following.

Further, it is to be understood that, although the blocks shown in the figures are described as units, members, filters, etc., these are to be understood as means for achieving the desired function, especially in the event that their functions are implemented as software in, for example, microprocessors.

Figure 1:
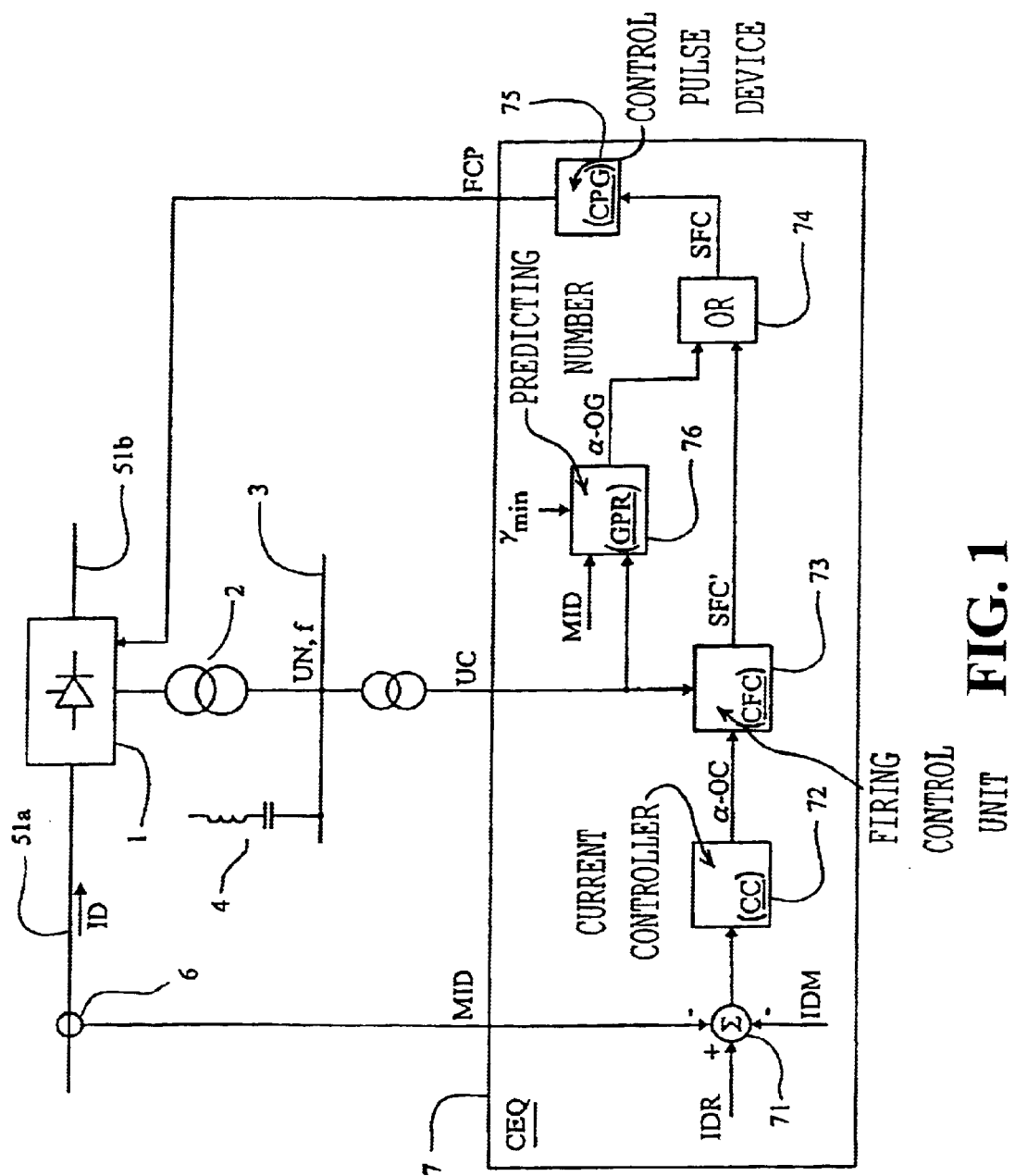
FIG. 1 shows a known embodiment of part of a converter station in an installation for transmission of high-voltage direct current.

FIG. 1 shows a thyristor converter 1 for conversion between alternating current and direct current in an installation for transmission of high-voltage direct current. The ac side of the converter is connected, via a converter transformer 2, to an ac voltage network 3 with a fundamental frequency f, usually nominally equal to 50 Hz or 60 Hz. A tuned filter 4 for shunting of harmonics generated by the converter and for generating reactive power is connected to the ac voltage network. The dc side of the converter is connected to a dc connection, of which only conductors 51a and 51b are shown in the figure. A current measuring device 6 at the conductor 51a senses a direct current ID flowing through the converter and forms a measured value MID thereof, which measured value is supplied to control equipment 7 for control of the converter.

The control equipment, which via a transformer 8 connected to the ac voltage network is supplied with a voltage UC corresponding to the commutating voltage for the valves of the converter, comprises in a known manner a current controller 72, which is supplied with the difference, generated by a difference-forming member 71, between a current reference value IDR and the sum of the current measurement value MID and a marginal current value IDM. For the purpose of the description, it is assumed in the following that the converter operates as an inverter and that a converter (not shown), which operates as a rectifier, is connected to the dc connection, whereby both of the converters mentioned operate with current reference values which are identical in magnitude. In a known manner, the current controller comprises an integrating function, and its output signal α-OC, which constitutes a value of the control angle α, ordered by the current controller, will thus assume a maximum value limited by a limiting circuit, not shown in the figure.

The output signal from the current controller is supplied to a firing control unit 73 which, in dependence thereon, and synchronized with the voltage UC, as output signal generates pulses SFC', which in time correspond to the control angle ordered by the current controller. The output signal SFC' from the firing control unit is supplied, via an OR circuit 74, to a control pulse device 75, which, in dependence on the output signal of the OR circuit, generates control pulses FPC for the valves of the converter, which control pulses are supplied to the converter.

A predicting member 76, for example of the kind described above, is supplied with the current measurement value MID and the voltage UC, and predicts, in dependence on these quantities, continuously that commutation margin $\gamma_{pred}$ which would be obtained if firing were to take place at the instant of prediction. The predicting member is also supplied with a minimum reference value $\gamma_{min}$ for the extinction angle, and when the predicted value becomes equal to the minimum reference value, an output signal α-OG is obtained, which via the OR circuit 74 is supplied to the control pulse device 75. The output signal α-OG constitutes a value of the control angle α ordered by the predicting extinction-angle control. In the event that the thyristor of the commutated valve should not have received an earlier firing pulse via the current controller, firing of the valve is thus initiated by the predicting member 76.

The above description of the control equipment 7, known per se, is simplified and schematic; a more complete description is to be found in Åke Ekström: High Power Electronics HVDC and SVC, The Royal Institute of Technology, Stockholm 1990, pages 7–8 to 7–16, to which reference is hereby made.

Figure 2:
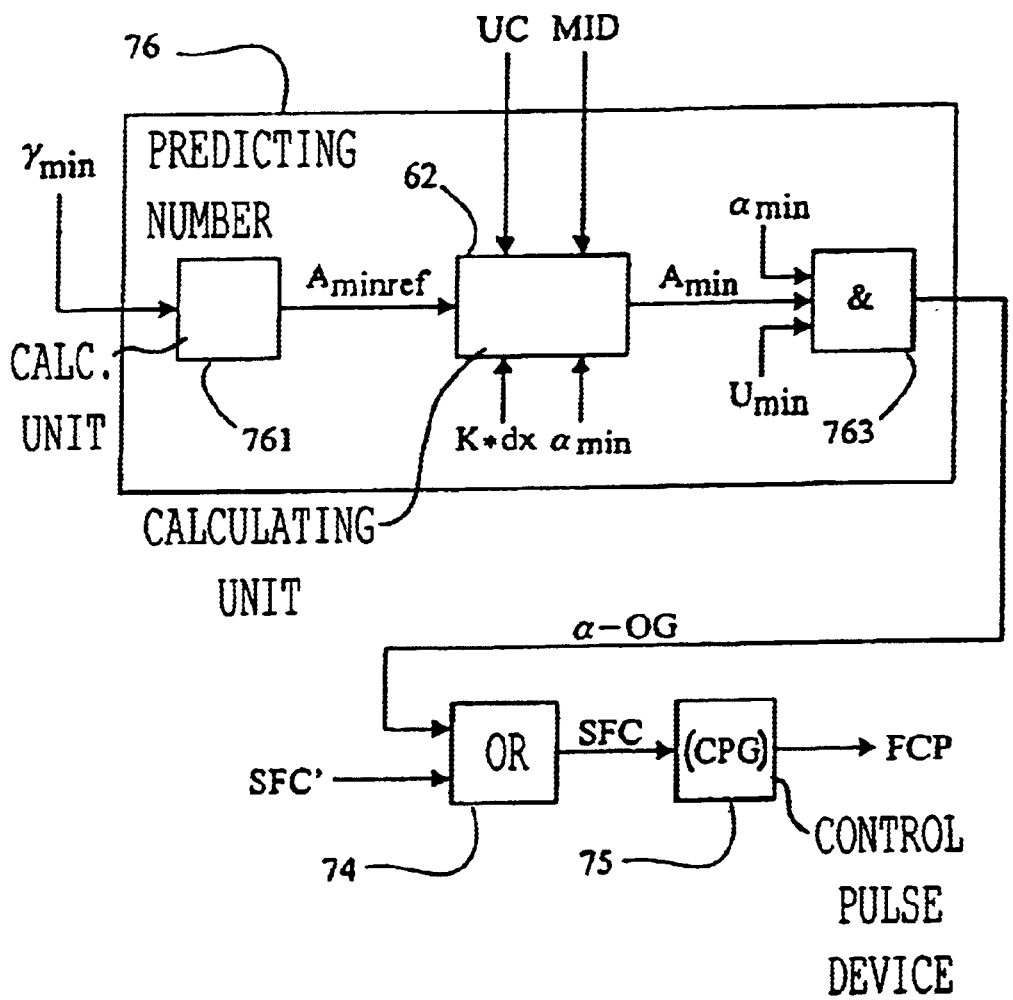
FIG. 2 shows part of control equipment according to FIG. 1.

FIG. 2 shows a known embodiment of the predicting member 76 based on the above-described criterion that a certain voltage-time area is required to carry out a commutation. Reference numerals and designations in FIG. 2 indicate blocks and signals of the same kind as those described with the corresponding designations with reference to FIG. 1. The minimum reference value $\gamma_{min}$ for the extinction angle is supplied to a calculating unit 761, which in dependence thereon, via a transformation from an electrical angle to a corresponding time, forms a reference value for the minimum voltage-time area $A_{minref}$, corresponding to the minimum reference value of the extinction value. The reference value for the voltage-time area is supplied to a calculating unit 762, which in dependence on the commutating voltage, the current measurement value and stored information about the impedance of the commutating circuit, in the figure designated K*dx, as described above forms an output signal $A_{min}$ when the predicted voltage-time area becomes equal to the reference value. This output signal is supplied to an AND circuit 793, which forms the output signal α-OG described with reference to FIG. 1. The signal α-OG is formed in dependence on the fact that the ac voltage and the minimum control angle lie within the prescribed limits, which in the figure is marked by the signals $\alpha_{min}$ and $U_{min}$, which are both supplied to the AND circuit 763.

According to the invention, the minimum reference value $\gamma_{min}$ for the extinction angle is now formed in dependence on a continuously formed operating value of the recovery time for the semiconductor elements of a decommutating valve.

With knowledge of which type of semiconductor element is included in the valves in the converter to which the predicting extinction-angle control according to the invention is to be applied, information about the nominal recovery time tq(nom) of the semiconductor elements, usually expressed in microseconds, as well as a number of correction factors to this nominal recovery time, can be obtained from the data sheet of the supplier, which correction factors are each dependent on one or more of the operating parameters of the valve/the semiconductor element.

In the following, three correction factors, called tq(Tj), tq(dUb/dt) and tq(dI/dt), will be explained in greater detail.

The correction factors are usually expressed as dimension-less numbers, such that the corrected value tq of the recovery time of the semiconductor element, when taking into consideration all the three correction factors mentioned, is obtained in accordance with the expression $$i\ tq = tq(nom) * tq(Tj) * tq(dUb/dt) * tq(dI/dt) \quad (1)$$

A first correction factor tq(Tj) considers the junction temperature Tj of the semiconductor element, a second correction factor tq(dUb/dt) considers the rate of change dUb/dt of the blocking voltage Ub of the semiconductor element in the forward direction thereof, and a third correction factor tq(dI/dt) considers the rate of change dI/dt of the commutated current. The rate of change of the blocking voltage of the semiconductor element in the forward direction thereof means in this connection the time rate of change of the blocking voltage which is built up across the semiconductor element when current has ceased to flow through the semiconductor element.

The dependence of the mentioned correction factors on the respective operating parameters can be expressed, at least approximately by means of mathematical relationships, and according to a preferred embodiment of the invention, the correction factors are determined in the manner described below.

Correction Factor for the Junction Temperature of the Semiconductor Element

The correction factor tq(Tj) for the junction temperature Tj of the semiconductor element is calculated from an expression, typically of the form $$tq(Tj) = \exp\ (K1 - K2/(273 + Tj)) \quad (2)$$

where Tj is the junction temperature of the semiconductor element, K1 and K2 are constants which may be determined on the basis of data sheets for the semiconductor elements in question, and the constant '273' is a conversion constant between degrees Kelvin and degrees centigrade. 'exp' denotes that the expression after 'exp' constitutes an exponent to the base e for the natural logarithm system.

For a certain semiconductor element, typical values of the constants are K1=4.3 and K2=1700.

The junction temperature of the semiconductor element is then determined on the basis of the expression $$Tj=Tcw+Ptya*Rthe \qquad (3)$$

where Tcw is a continuously sensed mean value of the temperature of the coolant of the valve, Ptya is a calculated mean value of thermal losses in the semiconductor element, and Rthe is a value of the thermal resistance between the coolant and the semiconductor layer of the semiconductor element, which value is determined on the basis of the design of the valve.

The mean value Ptya of the thermal losses of the semi conductor element is calculated from the expression $$Ptya = k_p * \left(V_{to} * Id + r_t * Id^2 * \frac{360-\mu}{360}\right) + P_{on} + P_{off} \qquad (4)$$

In expression (4), $k_p$ is a constant, the contents within parentheses an expression for the on-state losses of the semiconductor element, and $P_{on}$ and $P_{off}$ for its turn-on and turn-off losses, respectively. Id is the direct current through the semiconductor element, $V_{to}$ its threshold voltage at the transition to the conducting state, $r_t$ its resistive voltage drop. The constant $k_r$ has the value ⅓ during normal commutation procedures with the value 1 during commutating errors. The turn-on losses $P_{on}$ may in turn be expressed as $P_{on}=w_{on} * f$, and the turn-off losses $P_{off}$ as $$P_{off} = k_{off} * \left(\frac{Udi0}{n}\right)^2 * \sin^2\gamma.$$

Here, f is the fundamental frequency of the ac voltage network, Udi0 the ideal no-load dc voltage of the converter, n the number of series-connected semiconductor elements per valve, and $w_{on}$ and $k_{off}$ are parameters which depend on the component data of the semiconductor element. The ideal no-load dc voltage of the converter is determined continuously by sensing, for example, the voltage at the converter transformer and with knowledge of the actual tap-changer position thereof.

Correction Factor for the Rate of Change of the Blocking Voltage of the Semiconductor Element The correction factor tq(dUb/dt) for the rate of change of the blocking voltage Ub of the semiconductor element in the forward direction of the blocking voltage is calculated from an expression, typically of the form $$tq(dUb/dt)=((dUb/dt)/K3)^{E1} \qquad (5)$$

where K3 and E1 are constants which may be determined on the basis of data sheets for the relevant semiconductor elements.

For a certain semiconductor element, typical values of the constants are K3=20 and E1=0.25.

The rate of change dUb/dt is thereby calculated from the expression $$dUb/dt=2\pi f*Udi0*\pi/3n \qquad (6)$$

where n is the known number of series-connected semiconductor elements per valve.

Correction Factor for the Rate of Change of the Commutated Current

The correction factor tq(dI/dt) for the rate of change dI/dt of the commutated current is calculated from an expression, typically of the form $$tq(dI/dt)=\exp(K4+K5*\ln(dI/dt)) \qquad (7)$$

where K4 and K5 are constants which may be determined on the basis of data sheets for the relevant semiconductor elements, and 'ln' designates the natural logarithm.

For a certain semiconductor element, typical values of the constants are K4=−0.003 and K5=0.056.

The rate of change dI/dt of the commutated current is thereby calculated from an expression of the form $$dI/dt=Idn*2\pi f* Udi0*\sin(\gamma)/(2*dxn*Udi0n) \qquad (8)$$

where Idn is the nominal direct current, γ is a value of the extinction angle, dxn is the relative voltage drop in the commutating circuit, and Udi0n is the nominal value of the ideal no-load dc voltage.

The value γ of the extinction angle may, in a manner known per se, be calculated from the relationship α+μ+γ= 180° where the value of the overlap angle μ is given from the likewise known relationship μ=arccos(cosα−2dx)−α. The value of the control angle α is thereby the control angle of the last fired valve in the inverter.

Figure 3:
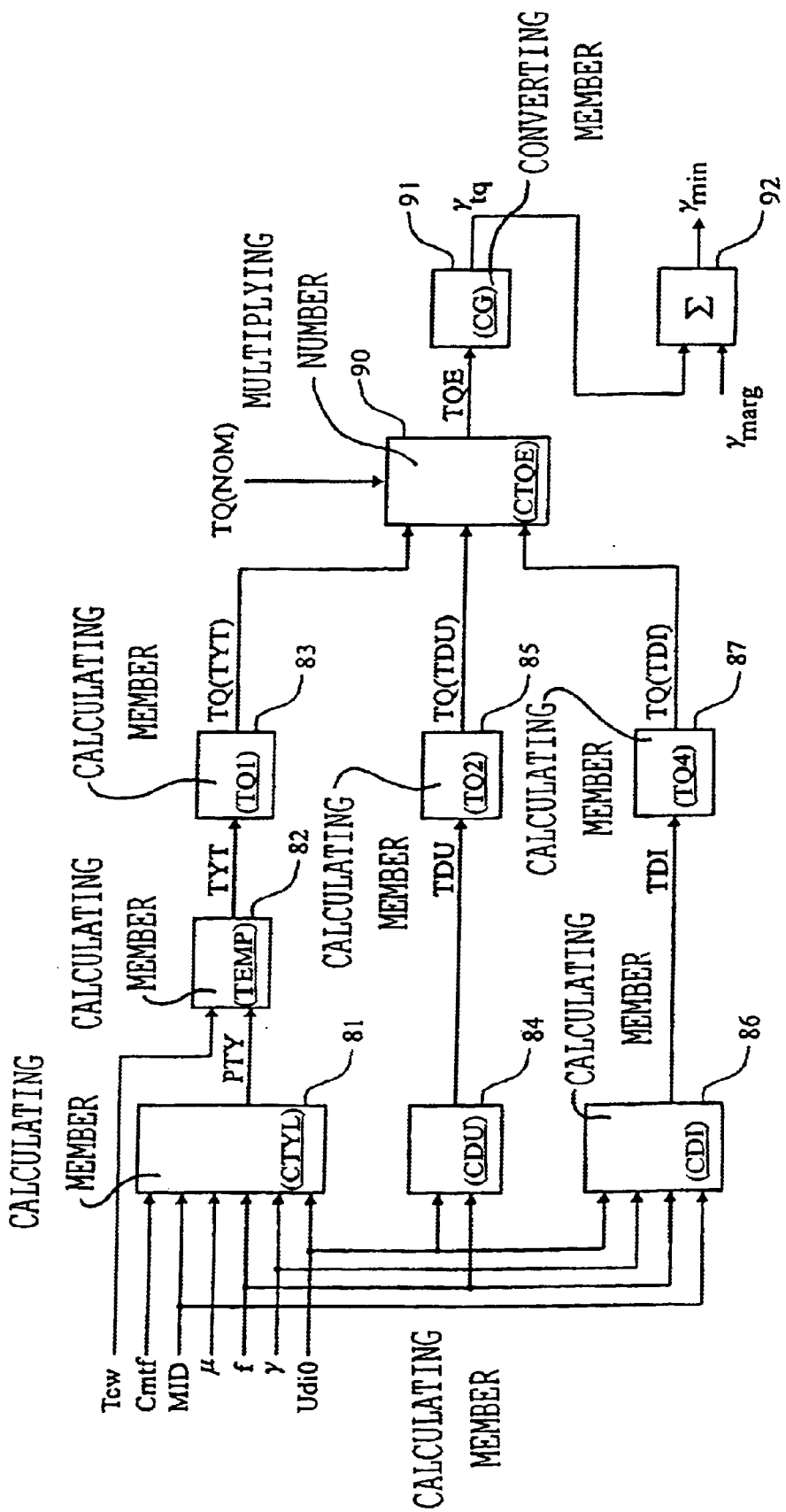
FIG. 3 shows an embodiment of a calculating unit according to the invention in control equipment according to FIG. 2.

FIG. 3 illustrates an advantageous embodiment of a calculating unit for forming the operating value of the recovery time.

The calculating unit comprises a number of calculating members which are assumed to be arranged, in some manner known per se, to carry out the calculations described below. A calculating member 81 is adapted, in dependence on continuously supplied values of the direct current ID, the overlap angle μ, the fundamental frequency f of the ac voltage network, the extinction angle γ, and the ideal no-load dc voltage Udi0, to calculate a mean value, in the figure marked as an output signal PTY from the calculating member, of the thermal losses of the semiconductor element according to the expression (4) above. A calculating member 82 is adapted, in dependence on this mean value as well as a supplied value Tcw of the coolant temperature, to calculate the junction temperature of the semiconductor element, in the figure marked as an output signal TYT from the calculating member, according to expression (3) above. A calculating member 83 is adapted, in dependence thereon, to calculate a value of the correction factor tq(Tj) for the junction temperature Tj of the semiconductor element, in the figure marked as an output signal TQ(TYT) from the calculating member, according to expression (2) above.

The calculating member 81 is also supplied with a signal Cmtf, indicating a commutating error in the valve, detected in some manner known per se. A commutating error results in the valve in question remaining conducting for one full electrical cycle instead of, as during undisturbed operation, for one-third of this cycle, and the signal Cmtf hence influences the calculation of the thermal losses of the semiconductor element according to expression (4) such that the dividing factor 3 is replaced by a factor 1.

A calculating member 84 is adapted, in dependence on supplied values of the frequency f of the ac voltage network and the ideal no-load dc voltage Udi0, to calculate a value of the rate of change dUb/dt, in the figure marked as an output signal TDU from the calculating member, of the blocking voltage Ub of the semiconductor element in the forward direction thereof according to expression (6) above. A calculating member 85 is adapted, in dependence, thereon, to calculate a value of the correction factor tq(dUb/dt) for the rate of change dUb/dt, in the figure marked as an output signal TQ(TDU) from the calculating member, according to expression (5) above.

A calculating member 86 is adapted, in dependence on supplied values of the frequency f of the ac voltage network, the extinction angle γ, and the ideal no-load dc voltage. Udi0, to calculate a value of the rate of change dI/dt, in the figure marked as an output signal TDI from the calculating member, of the commutated current according to expression (8) above. A calculating member 87 is adapted, in dependence thereon, to calculate a value of the correction factor tq(dI/dt), in the figure marked as an output signal TQ(TDI) from the calculating member, for the rate of change dI/dt of the commutated current according to expression (7) above.

All of the values of correction factors thus calculated are supplied, together with a value TQ(NOM) of the nominal recovery time tq(nom) of the semiconductor elements, to a multiplying member 90 which forms an operating value TQE of the recovery time tq for the semiconductor of the decommutated valve, expressed in microseconds, as the product of the nominal value of the recovery time and the correction factors according to the expression $$TQE=TQ(NOM)*TQ(TYT)*TQ(TDU)*TQ(TDI) \quad (9)$$

corresponding to expression (1) above.

The operating value TQE is supplied to a converting member 91, which converts the operating value of the recovery time into a corresponding electrical angle $\gamma_{tq}$ according to the expression $$\gamma_{tq}=TQE*f*360 \quad (10)$$

A summing member 92 is supplied with the angle $\gamma_{tq}$ and with an angle, in FIG. 3 commonly designated by an angle $\gamma_{marg}$, corresponding to the other margins for the extinction-angle control to ensure the transmission system a certain control margin in the event of a disturbance of the ac voltage network, such as, for example, a voltage transient, a distortion or an amplitude reduction.

Thus, according to the invention, the output signal $\gamma_{min}=\gamma_{tq}+\gamma_{marg}$ from the summing member constitutes a minimum reference value for the extinction-angle controlling system for the converter.

The invention is not limited to the embodiments shown but a plurality of modifications are feasible for the invention as defined by the claims.

Thus, the blocks and the calculating member shown in the figures, and comprised in the control equipment of the converter, may, in applicable parts, be formed as analogue and/or digital models, or wholly or partly by means of analogue and/or digital circuits, or be implemented as computer programs for execution in an appropriate microprocessor.

As an alternative to the calculating expressions according to the above expressions 2, 5, and 7, especially when the calculations of the operating value take place by execution of a computer program, information from data sheets for the semiconductor elements may be stored in the form of tables in a readable memory and parameter values be obtained from these tables by interpolation.

Depending on the application in question, for the sake of simplification, approximations which are considered by the person skilled in the art to be suitable may, of course, be introduced in the above-described relationships for the correction factors, and, likewise, one or more of the three mentioned correction factors may possibly be completely omitted. Usually, the first correction factor tq(Tj), which considers the junction temperature Tj of the semiconductor element, is the dominating one.

The recovery time of the semiconductor element also has a certain dependence on the extinction voltage of the semiconductor element. By the extinction voltage is meant, in this context, the maximum voltage in the reverse direction to which the semiconductor element is subjected during that stage of the commutation when the semiconductor element builds up voltage of a negative polarity. The extinction voltage may thus, in a known manner, be calculated from an expression $$Ue = \frac{\pi}{3}Udi0(1+f_{com})\sin\gamma$$

where the factor $f_{com}$ is a measure, specific for the converter station in question, of the overshoot in voltage which arises during the mentioned stage of the commutation.

What is claimed is:

1. A method for control of an extinction angle of a line-commutated converter in dependence on a minimum reference value for the extinction angle, the converter having a plurality of valves, each one of the plurality of valves having at least one semiconductor element capable of being fired, whereby, for a commutating valve, firing control pulses are generated in dependence on the minimum reference value of the extinction angle according to a given criterion for commutation of a direct current through the converter, wherein an operating value of recovery time (tq) for the semiconductor elements of a decommutating valve is continuously formed, and wherein the minimum reference value of the extinction angle is formed in dependence on said operating value.

2. A method according to claim 1, wherein said operating value of recovery time is formed in dependence on at least one of a continuously formed operating value of a junction temperature of said semiconductor element, a continuously formed operating value of a rate of change of a blocking voltage of the semiconductor element in a forward direction, and a continuously formed operating value of a rate of change of the commutated current.

3. A method according to claim 2, wherein said operating value of recovery time is formed in dependence on said operating value of the junction temperature of the semiconductor element, whereby a nominal value of the recovery time of said semiconductor element is corrected by a factor, formed in dependence on an expression tq(Tj)=exp(K1−K2/(273+Tj)), where Tj is an actual junction temperature of the semiconductor element, K1 and K2 are constants, and 'exp' denotes that the expression after 'exp' constitutes an exponent of the base e for the natural logarithm system.

4. A method according to claim 2, wherein said operating value of recovery time is formed in dependence on said operating value of the rate of change of the blocking voltage of the semiconductor element in the forward direction thereof, whereby a nominal value of the recovery time of said semiconductor element is corrected by a factor, formed in dependence on an expression tq(dUb/dt)=((dUb/dt)/

$K3)^{E1}$, where dUb/dt is a continuously formed value of said rate of change and K3 and E1 are constants.

5. A method according to claim 2, wherein said operating value of recovery time is formed in dependence on said operating value of the rate of change of the commutated current, whereby a nominal value of the recovery time of said semiconductor element is corrected by a factor, formed in dependence on an expression tq(dI/dt)=exp(K4+K5*ln(dI/dt)), where dI/dt is a continuously formed value of said rate of change, K4 and K5 are constants, and 'ln' designates the natural logarithm.

6. A device for control of an extinction angle of a line-commutated converter in dependence on a minimum reference value for the extinction angle, the converter having a plurality of valves, each one of the plurality of valves having at least one semiconductor element capable of being fired, the device comprising:

means for generating firing control pulses for a commutating valve in dependence on the minimum reference value for the extinction angle according to a given criterion for commutation of a direct current through the converter;

means for continuously forming an operating value of recovery time (tq) for the semiconductor element of a decommutating valve; and means for forming the minimum reference value for the extinction angle in dependence on said operating value.

7. A device according to claim 6, further comprising at least one of:

means for continuously forming an operating value of the junction temperature of said semiconductor element;

means for continuously forming an operating value of a rate of change of a blocking voltage of the semiconductor element in a forward direction; and means for continuously forming an operating value of a rate of change of the commutated current.

8. A device according to claim 7, further comprising:

means for forming, in dependence on said operating value of the junction temperature of said semiconductor element, a correction factor according to an expression tq(Tj)=exp(K1−K2/(273+Tj)), where Tj is an actual junction temperature of the semiconductor element, K1 and K2 are constants, and 'exp' denotes that the expression after 'exp' constitutes an exponent of the base for the natural logarithm system; and means for forming said operating value of recovery time in dependence on said correction factor.

9. A device according to claim 7, further comprising:

means for forming, in dependence on said operating value of the rate of change of the blocking voltage of said semiconductor element in the forward direction, a correction factor according to an expression $tq(dUb/dt)=((dUb/dt)/K3)^{E1}$, where dUb/dt is a continuously formed value of said rate of change and K3 and E1 are constants; and means for forming said operating value of recovery time in dependence on said correction factor.

10. A device according to claim 7, further comprising:

means for forming, in dependence on said operating value of the rate of change of the commutated current, a correction factor according to an expression tq(dI/dt)=exp(K4+K5*ln(dI/dt)), where dI/dt is a continuously formed value of said rate of change, K4 and K5 are constants and 'ln' designates the natural logarithm; and means for forming said operating value of recovery time in dependence on said correction factor.

* * * * *